3,081,171
STABILIZATION OF CAROTENOID MATERIAL
Robert A. Reimers, Hinsdale, and Robert E. Morgan, Oak Lawn, Ill., assignors to Corn Products Company, New York, N.Y., a corporation of Delaware
No Drawing. Filed Sept. 1, 1959, Ser. No. 837,339
4 Claims. (Cl. 99—2)

This invention relates to stabilization of oleaginous solutions of carotenoids.

The object of this invention is the preparation of a stable oleaginous carotenoid solution suitable for use in feed formulations. Carotenoids are one of the principal types of plant pigments. They are characterized by their intense color, their solubility in oil and by a highly unsaturated structure. The parent compound of this series is beta-carotene, a precursor to vitamin A. Its structure is shown below:

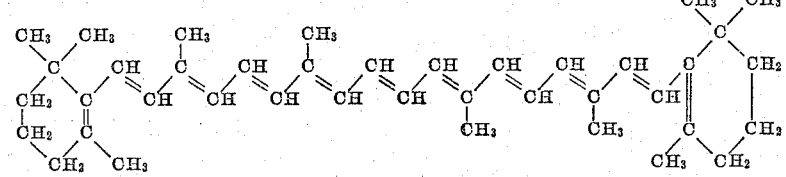

The carotenoids with which we are principally concerned here are those found in corn. The chief pigment is zeaxanthin, 3,3'-dihydroxy-beta-carotene; cryptoxanthin, the 3 hydroxy-beta-carotene, is also present in appreciable quantities as is beta-carotene itself. Alpha-carotene and its corresponding mono and dihydroxy derivatives are present in small quantities.

All these compounds are characterized by a long chain of conjugated double bonds. It is the presence of this unsaturation that accounts for the intense color of the carotenoids. It also accounts for the susceptability of these compounds to oxidation. While the course of oxidation has not been completely elucidated, it is apparent that oxidation does lead to the formation of less highly colored or colorless compounds.

In describing this invention, it is convenient to use xanthophyll oil as an example. It is to be understood, however, that this invention may be applied to other oleaginous solutions of carotenoids having a different carotenoid composition.

Xanthophyll oil is obtained as a by-product of the extraction of zein from corn gluten. It is essentially a mixture of the fatty compounds and the oil soluble pigments from corn gluten. The carotenoids of xanthophyll oil are principally those compounds mentioned previously, their positional isomers and their degradation products. The total carotenoid pigment content of this oil will usually run from 0.2 to 0.4 percent with the hydroxy carotenes making up 70–90 percent of the total.

Xanthophyll oil has found a ready market as a component in chicken feeds. The hydroxycarotenes in this oil have been shown to cause the fat of the bird to become yellow, a feature which improves the saleability of the chicken considerably.

One of the problems in the manufacture and sale of xanthophyll oil is the lack of stability of its pigments. On exposure to air, especially at elevated temperatures, the pigment content of xanthophyll oil drops rapidly.

We have discovered that soybean lecithin is an unusually effective antioxidant for oleaginous solutions of carotenoids, provided it is employed at concentrations of from about 25 to about 75 percent. This is very surprising, in view of the face that at lower concentrations (for example, 2 percent) soybean lecithin exerts almost no stabilizing effect on these pigments. The effectiveness at various concentrations is shown in Table I.

The method for determining the oxidative stability of these xanthophyll oil-soybean lecithin blends is as follows: Samples in the amount of 3 ml. each of the blend to be tested were put into 50-ml. beakers and these beakers placed in a forced air-circulation oven held at 50° C. Usually 8 samples of each blend were started at one time. At frequent intervals a beaker was removed from the oven, the entire sample dissolved in hexane and the total carotenoid pigment content determined. The results from a series of samples taken at different times were plotted to determine the time required for a 50 percent pigment loss.

Blends of xanthophyll oil and soybean lecithin are easily prepared; the two liquids need merely be mixed together. This procedure, although effective, is slow due to the high viscosity of the lecithin, therefore, it is desirable to heat the mixture mildly to assure better mixing. Common laboratory practice is exemplified in the example given below:

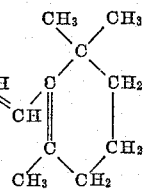

Fifty grams of soybean lecithin, sold under the designation Gliddol grade N by the Glidden Company, was added to 50 grams of xanthophyll oil and the mixture heated to 60° C. under a nitrogen blanket with mild agitation. The mixture was removed from the steam bath and stirred an additional 10 minutes to insure good mixing.

Samples (3 ml.) of this blend were pipetted into clean 50-ml. beakers and the beakers placed in a forced circulation air oven held at 50° C. At the desired intervals a beaker was withdrawn from the oven and its contents analyzed. The results are given below:

| Days at 50° C | 0 | 14 | 21 | 36 |
|---|---|---|---|---|
| Total pigment (mg./lb.) | 1,295 | 1,100 | 960 | 647 |

The stability of this sample was 36 days, the time required for a 50 percent loss of pigment.

Soybean lecithin is a commercial product which is available in large quantities. It is made by treating crude soybean oil with water and separating the precipitate from the bulk of the oil. This precipitate is dehydrated under vacuum to yield soybean lecithin, a dark material of grease-like consistency at room temperature. It may be fluidized in a variety of ways to yield a viscous liquid. Both the plastic and fluid grades are equally effective as antioxidants for xanthophyll oil.

The composition of soybean lecithin is quite complex and many of its individual compounds have not been identified. The commercial product contains about 35–40 percent triglycerides and 60 to 65 percent acetone insolubles. The latter are largely phosphatides such as phosphatidylcholine, phosphatidylethanolamine, phosphatidylserine, plasmalogens and the inositol phosphatides. Other compounds which are present are sterols, probably as glycosides, and tocopherols. This gross composition is not particularly different from that of corn lecithin, yet the latter is ineffective in stabilizing xanthophyll oil.

The stabilizing effect of soybean lecithin is not due simply to dilution of the pigments. Such diluents as crude corn oil or crude soybean oil either did not appreciably affect the stability of the pigments in xanthrophyll oil or improved them by a factor of onyl 3 to 4.

The stabilizing effect of soybean lecithin on the carotenoid pigments of xanthophyll oil is retained even in the presence of diluent oils. This is shown in the data of Table II. Again major quantities of soybean lecithin are required to stabilize the blends.

The advantages of this invention are that for the first time we have a practical, inexpensive way to stabilize xanthophyll oil pigments. The edibility of soybean lecithin has been well established, thus there is no fear of harmful effects to the animals. Stabilization of xanthophyll oil will permit long distance shipment or prolonged storage without fear of decomposition of the carotenoid pigments.

The unique feature of this invention is the effectiveness of large quantities of soybean lecithin in preventing carotenoid oxidation, whereas amounts ordinarily recommended for antioxidants are relatively ineffective. Evans (Ind. Eng. Chem. 27, 329 (1935)), for example, uses a maximum of 0.1 percent in vegetable oils. It is characteristic of most antioxidants that dosages above a certain low level are not effective in increasing the stability of the substrate. Thus, alpha-tocopherol, a naturally occurring antioxidant, at concentrations above 0.06 percent did not further extend the stability of lard (Oil and Soap 21, 188–93 (1944)). The same is true of the synthetic antioxidants (The Hormel Institute Publication No. 20, page 10 (1947)). In our case we have found the amounts conventionally used to be ineffective; until about 25 percent soybean lecithin by weight is added to the blend, the improvement in stability is of little practical value. The upper practical limit is about 75 percent. Soybean lecithin is unique in that it is the only antioxidant cheap enough to be economically useful at so high a concentration. And its physical characteristics are such that resulting product is a viscous oil which can be easily handled.

TABLE I

*Effect of Various Amounts of Soybean Lecithin on the Stability of Xanthophyll Oil*

| Amount Lecithin (Percent) | Amount Xanthophyll Oil (Percent) | Pigment Stability at 50° C. (days) | Protection Factor |
|---|---|---|---|
| None | 100 | 2 | 1.0 |
| 2 | 98 | 3 | 1.5 |
| 10 | 90 | 9 | 4.5 |
| 25 | 75 | 16 | 8.0 |
| 50 | 50 | 36 | 18.0 |
| 75 | 25 | 28 | 14.0 |

TABLE II

*Dilution of Lecithin-Xanthophyll Oil Blends*

| Composition of Blend (Percent) | | | Stability at 50° C. (days) | Protection Factor |
|---|---|---|---|---|
| Xanthophyll Oil | Soybean Lecithin | Diluent | | |
| 100 | 0 | 0 | 2 | — |
| 50 | 50 | 0 | 22 | 11.0 |
| 50 | 25 | 25 Crude soybean oil | 16 | 8.0 |
| 50 | 10 | 40 Crude soybean oil | 7 | 3.5 |
| 50 | 0 | 50 Crude soybean oil | 4 | 2.0 |
| 50 | 0 | 50 Yellow grease | 2 | 1.0 |
| 50 | 25 | 25 Yellow grease | 27 | 13.5 |

We claim:

1. A composition of matter stable to oxidative deterioration and liquid at normal temperatures consisting essentially of from about 75 to about 25 percent, by weight, of an oleaginous carotenoid material and about 25 to about 75 percent, by weight, of soybean lecithin.

2. A process for stabilizing an oleaginous carotenoid solution which consists essentially of adding about 25 to about 75 percent, by weight of the final composition of soybean lecithin to from about 75 to about 25 percent, by weight of the final composition, of an oleaginous carotenoid material, said final composition being liquid at normal temperatures.

3. A composition of matter stable to oxidative deterioration and liquid at normal temperatures consisting essentially of from about 75 to about 25 percent, by weight, of xanthophyll oil and about 25 to about 75 percent, by weight, of soybean lecithin dissolved therein.

4. A process for stabilizing xanthophyll oil which consists essentially of adding about 25 to about 75 percent, by weight of the final composition, of soybean lecithin to from about 75 to about 25 percent, by weight of the final composition, of xanthophyll oil, said final composition being liquid at normal temperatures.

References Cited in the file of this patent

UNITED STATES PATENTS

| 2,198,214 | Musher | Apr. 23, 1940 |
| 2,632,705 | Scharf | Mar. 24, 1953 |
| 2,924,525 | Kruse | Feb. 9, 1960 |